US012696229B2

(12) United States Patent
Cha et al.

(10) Patent No.: US 12,696,229 B2
(45) Date of Patent: Jul. 28, 2026

(54) INDICATING TRANSMISSION TIMING CHANGES

(71) Applicant: Nokia Technologies Oy, Espoo (FI)

(72) Inventors: Hyun-Su Cha, Oak Park, IL (US); Ryan Keating, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 306 days.

(21) Appl. No.: 18/697,147

(22) PCT Filed: Aug. 29, 2022

(86) PCT No.: PCT/EP2022/073879

§ 371 (c)(1),
(2) Date: Mar. 29, 2024

(87) PCT Pub. No.: WO2023/052014

PCT Pub. Date: Apr. 6, 2023

(65) Prior Publication Data

US 2024/0406916 A1    Dec. 5, 2024

Related U.S. Application Data

(60) Provisional application No. 63/251,103, filed on Oct. 1, 2021.

(51) Int. Cl.
*H04W 64/00*        (2009.01)
*H04L 5/00*        (2006.01)

(52) U.S. Cl.
CPC .................................. *H04W 64/00* (2013.01)

(58) Field of Classification Search
None
See application file for complete search history.

(56) References Cited

U.S. PATENT DOCUMENTS 8,543,128 B2 *    9/2013    Jen ....................... H04B 7/2606
                                                    455/67.14
9,234,957 B2 *    1/2016    Stern-Berkowitz .........................
                                                    H04L 27/2655

(Continued)

FOREIGN PATENT DOCUMENTS

WO        WO 2021187962 A1        9/2021

OTHER PUBLICATIONS

PCT/EP2022/073879—ISR Mar. 20, 2023—6 pgs.

(Continued)

*Primary Examiner* — Tuan A Tran
(74) *Attorney, Agent, or Firm* — Lippes Mathias LLP

(57)        ABSTRACT

Disclosed is a method comprising receiving one or more first reference signals; transmitting one or more second reference signals; receiving a message comprising at least a first vector, wherein the first vector comprises one or more values indicating one or more transmission timing changes associated with one or more transmission occasions of the one or more first reference signals within a time window; determining one or more positioning measurement values based at least partly on the one or more first reference signals and the message; determining time difference information between a reception time of the one or more first reference signals and a transmission time of the one or more second reference signals; and transmitting a report indicating the one or more positioning measurement values and the time difference information.

14 Claims, 7 Drawing Sheets

(56) References Cited

U.S. PATENT DOCUMENTS

| | | | | |
|---|---|---|---|---|
| 9,467,803 | B2 | 10/2016 | Siomina et al. | |
| 9,648,573 | B2 * | 5/2017 | Siomina | H04W 24/08 |
| 10,390,324 | B2 * | 8/2019 | Kazmi | H04W 64/00 |
| 10,715,951 | B1 * | 7/2020 | Ratasuk | H04W 24/10 |
| 10,784,940 | B2 * | 9/2020 | Tang | H04L 5/0048 |
| 11,523,459 | B2 * | 12/2022 | Bao | H04W 76/28 |
| 11,569,883 | B2 * | 1/2023 | Cha | H04B 7/088 |
| 11,751,082 | B2 * | 9/2023 | Manolakos | H04L 5/0051 |
| | | | | 370/252 |
| 11,892,553 | B2 * | 2/2024 | Cha | H04W 64/00 |
| 11,933,908 | B2 * | 3/2024 | Kuo | G01S 5/021 |
| 11,979,845 | B2 * | 5/2024 | Cha | H04W 64/00 |
| 12,052,632 | B2 * | 7/2024 | Amiri | H04W 24/10 |
| 12,326,507 | B2 * | 6/2025 | Fischer | G01S 5/0036 |
| 2019/0319690 | A1 * | 10/2019 | Tang | H04B 17/336 |
| 2020/0053703 | A1 * | 2/2020 | Akkarakaran | G01S 1/20 |
| 2024/0137897 | A1 * | 4/2024 | Goyal | G01S 5/0205 |
| 2024/0397395 | A1 * | 11/2024 | Cui | H04W 36/06 |
| 2024/0410972 | A1 * | 12/2024 | Alawieh | G01S 5/10 |

OTHER PUBLICATIONS

PCT/EP2022/073879—WR OPN Mar. 20, 2023—11 pgs.

Qualcomm Incorporated, "Enhancements on Timing Error Mitigations for improved Accuracy", R1-2107345, vol. RAN WG1, No. e-Meeting; Aug. 16, 2021-Aug. 27, 2021, Aug. 6, 2021 (Aug. 6, 2021), Retrieved from the Internet: XP052038293 URL:https://ftp. 3gpp.org/tsg_ran/WG1_RL1/TSGR1_106-e/Docs/R1-2107345.zip.

Moderator (CATT), "FL Summary #2 for accuracy improvements by mitigating UE Rx/Tx and/or gNB Rx/Tx timing delays", R1-2106091, vol. RAN WG1, No. e-meeting; May 19, 2021-May 27, 2021, May 24, 2021 (May 24, 2021), Retrieved from the Internet: XP052013545 URL:https://ftp.3gpp.org/tsg_ran/WG1_RL1/TSGR1_105-e/Inbox/R1-2106091.zip.

OPPO, "Enhancement of timing-based positioning by mitigating UE Rx/Tx and/or gNB Rx/Tx timing delays", R1-2100128, vol. RAN WG1, No. e-Meeting; Jan. 25, 2021-Febb. 5, 2021, Jan. 18, 2021 (Jan. 18, 2021), Retrieved from the Internet: XP051970247 URL:https://ftp.3gpp.org/tsg_ran/WG1_RL1/TSGR1_104-e/Docs/R1-2100128.zip.

Moderator (Intel Corporation) "Feature Lead Summary #1 for NR Positioning UL-AoA Enhancements" 3GPP TSG RAN WG1 Meeting #104-E, R1-210zzzz e-Meeting, Jan. 25-Feb. 5, 2021 https://www.google.com/url?client=internal-element-cse&cx=0111477485590557393066:btgfoc_873q&q=https://www.3gpp.org/ftp/tsg_ran/WG1_RL1/TSGR1_104-e/Inbox/drafts/8.5.2/%255B104-e-NR-ePos-02%255D/R1-210zzzz%2520Summary%2520%255B104-e-NR-ePos-02%255D_v05_FhG_ZTE.docx&sa=U&ved=2ahUKEwiu3duau4_zAhW7yzgGHRjeAw8QFnoECAYQAQ&usg=AOvVaw1ddgJSnYI3OxIUr_UYJUAO.

Intel "WF on NR Positioning Performance Requirements" 3GPP TSG-RAN WG4 Meeting #99-e Electronic Meeting, May 19-27, 2021, R4-21xxxxx https://www.google.com/url?client=internal-element-cse&cx=0111477485590557393066:btgfoc_873q&q=https://www.3gpp.org/ftp/tsg_ran/WG4_Radio/TSGR4_99-e/Inbox/Drafts/%255B99-e%255D%255B215%255D%2520NR_pos_2/Docs/draft%2520R4-21xxxxx%2520WF%2520NR%2520Pos%2520perf%2520v1.pptx&sa=U&ved=2ahUKEwifo5mTto_zAhVT4zgGHVH8ADgQFnoECAQQAQ&usg=AOvVaw23KgNUnAib1wcvY4IrXQtY.

* cited by examiner

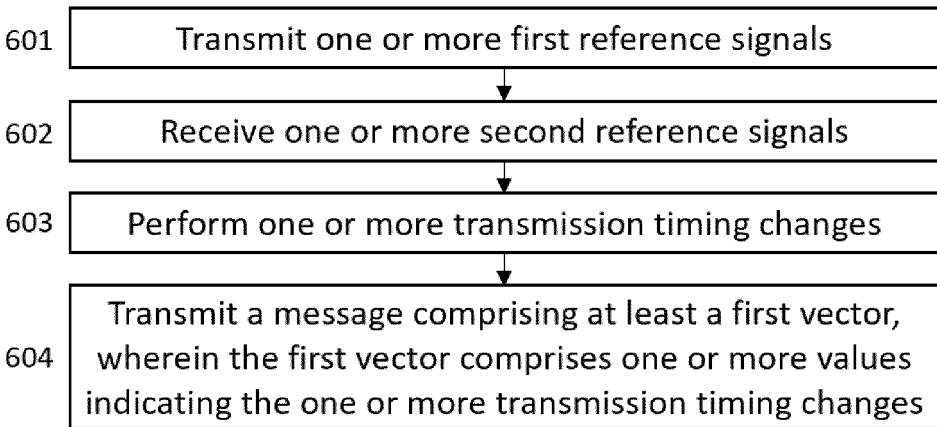

601 | Transmit one or more first reference signals

602 | Receive one or more second reference signals

603 | Perform one or more transmission timing changes

604 | Transmit a message comprising at least a first vector, wherein the first vector comprises one or more values indicating the one or more transmission timing changes

FIG. 6

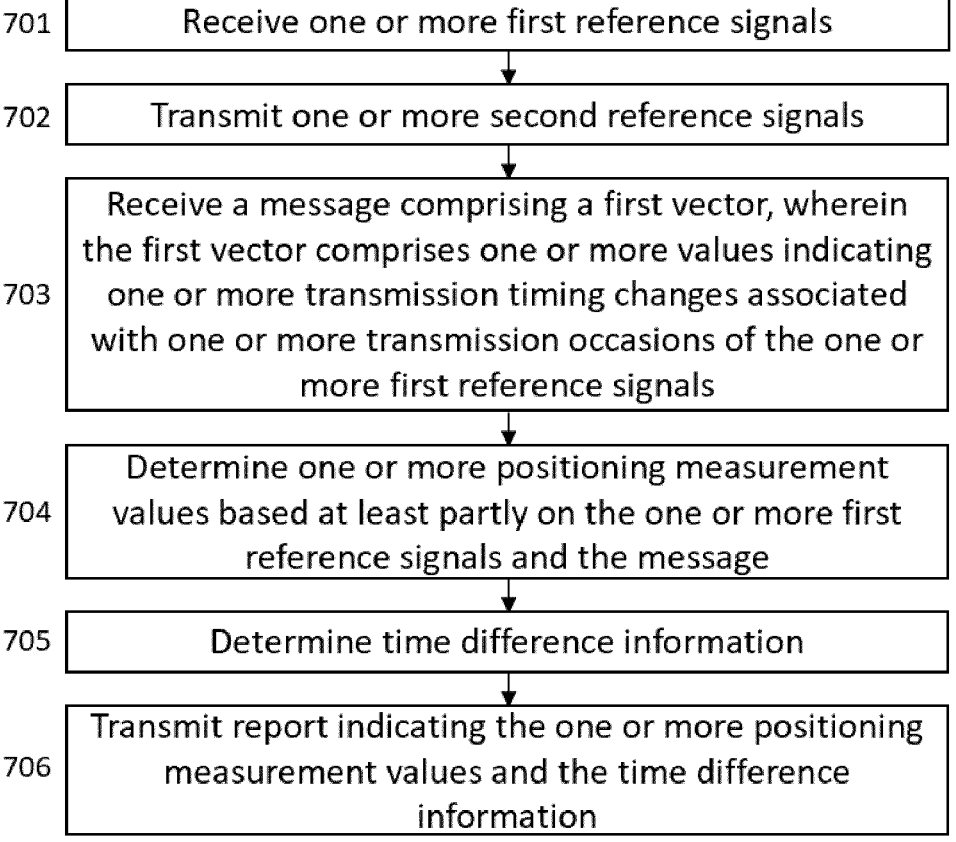

701 | Receive one or more first reference signals

702 | Transmit one or more second reference signals

703 | Receive a message comprising a first vector, wherein the first vector comprises one or more values indicating one or more transmission timing changes associated with one or more transmission occasions of the one or more first reference signals 704 | Determine one or more positioning measurement values based at least partly on the one or more first reference signals and the message 705 | Determine time difference information 706 | Transmit report indicating the one or more positioning measurement values and the time difference information

Figures 8, 9:
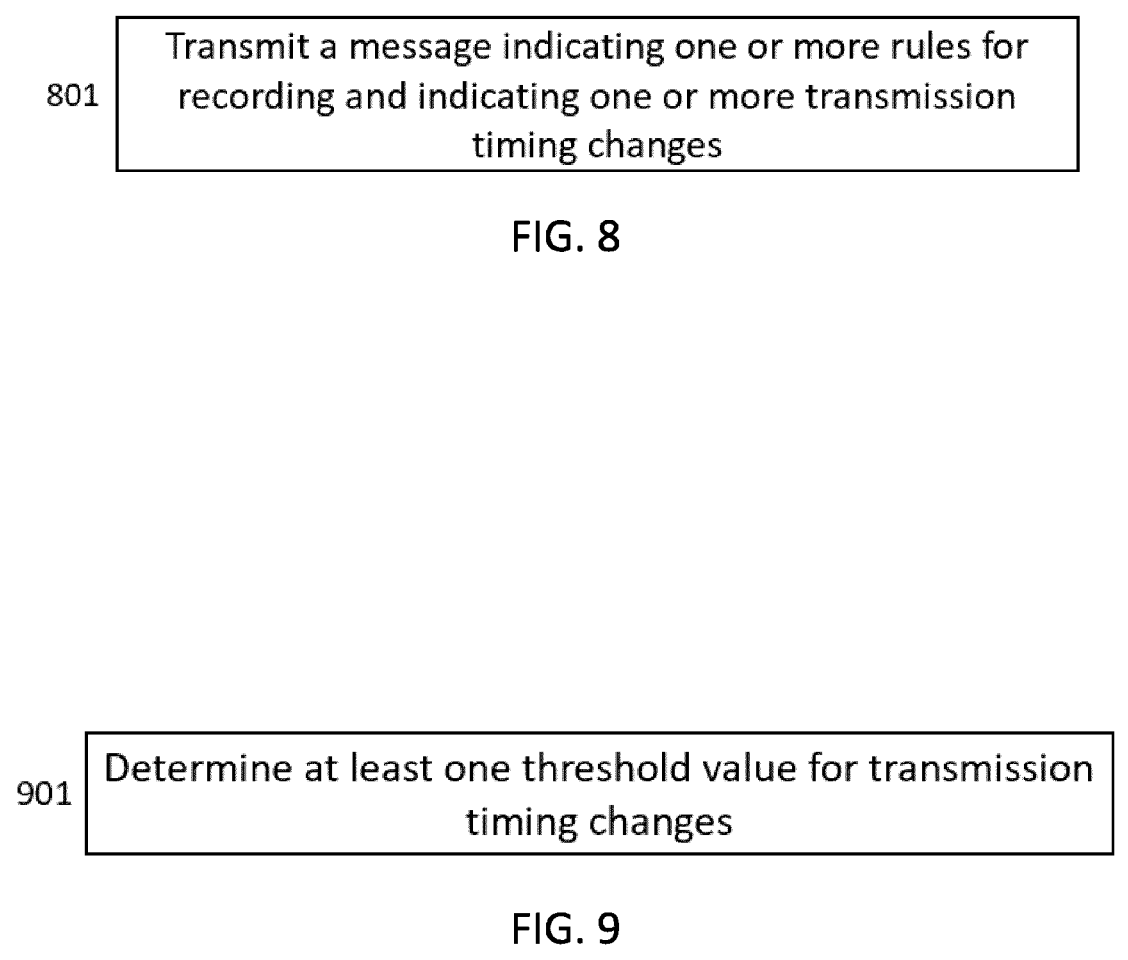

Transmit a message indicating one or more rules for recording and indicating one or more transmission timing changes

Determine at least one threshold value for transmission timing changes

INDICATING TRANSMISSION TIMING CHANGES

FIELD

The following exemplary embodiments relate to wireless communication and to positioning.

BACKGROUND

Positioning technologies may be used to estimate a physical location of a device. It is desirable to improve the positioning accuracy in order to estimate the device location more accurately.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive one or more first reference signals; transmitting one or more second reference signals; receive a message comprising at least a first vector, wherein the first vector comprises one or more values indicating one or more transmission timing changes associated with one or more transmission occasions of the one or more first reference signals within a time window; determine one or more positioning measurement values based at least partly on the one or more first reference signals and the message; determine time difference information between a reception time of the one or more first reference signals and a transmission time of the one or more second reference signals; and transmit a report indicating the one or more positioning measurement values and the time difference information.

According to another aspect, there is provided an apparatus comprising means for: receiving one or more first reference signals; transmitting one or more second reference signals; receiving a message comprising at least a first vector, wherein the first vector comprises one or more values indicating one or more transmission timing changes associated with one or more transmission occasions of the one or more first reference signals within a time window; determining one or more positioning measurement values based at least partly on the one or more first reference signals and the message; determining time difference information between a reception time of the one or more first reference signals and a transmission time of the one or more second reference signals; and transmitting a report indicating the one or more positioning measurement values and the time difference information.

According to another aspect, there is provided a method comprising: receiving one or more first reference signals; transmitting one or more second reference signals; receiving a message comprising at least a first vector, wherein the first vector comprises one or more values indicating one or more transmission timing changes associated with one or more transmission occasions of the one or more first reference signals within a time window; determining one or more positioning measurement values based at least partly on the one or more first reference signals and the message; determining time difference information between a reception time of the one or more first reference signals and a transmission time of the one or more second reference signals; and transmitting a report indicating the one or more positioning measurement values and the time difference information.

According to another aspect, there is provided a computer program product comprising program instructions which, when run on a computing apparatus, cause the computing apparatus to perform at least the following: receiving one or more first reference signals; transmitting one or more second reference signals; receiving a message comprising at least a first vector, wherein the first vector comprises one or more values indicating one or more transmission timing changes associated with one or more transmission occasions of the one or more first reference signals within a time window; determining one or more positioning measurement values based at least partly on the one or more first reference signals and the message; determining time difference information between a reception time of the one or more first reference signals and a transmission time of the one or more second reference signals; and transmitting a report indicating the one or more positioning measurement values and the time difference information.

According to another aspect, there is provided a computer program comprising instructions for causing an apparatus to perform at least the following: receiving one or more first reference signals; transmitting one or more second reference signals; receiving a message comprising at least a first vector, wherein the first vector comprises one or more values indicating one or more transmission timing changes associated with one or more transmission occasions of the one or more first reference signals within a time window; determining one or more positioning measurement values based at least partly on the one or more first reference signals and the message; determining time difference information between a reception time of the one or more first reference signals and a transmission time of the one or more second reference signals; and transmitting a report indicating the one or more positioning measurement values and the time difference information.

According to another aspect, there is provided a computer readable medium comprising program instructions for causing an apparatus to perform at least the following: receiving one or more first reference signals; transmitting one or more second reference signals; receiving a message comprising at least a first vector, wherein the first vector comprises one or more values indicating one or more transmission timing changes associated with one or more transmission occasions of the one or more first reference signals within a time window; determining one or more positioning measurement values based at least partly on the one or more first reference signals and the message; determining time difference information between a reception time of the one or more first reference signals and a transmission time of the one or more second reference signals; and transmitting a report indicating the one or more positioning measurement values and the time difference information.

According to another aspect, there is provided a non-transitory computer readable medium comprising program instructions for causing an apparatus to perform at least the following: receiving one or more first reference signals; transmitting one or more second reference signals; receiving a message comprising at least a first vector, wherein the first vector comprises one or more values indicating one or more transmission timing changes associated with one or more transmission occasions of the one or more first reference signals within a time window; determining one or more positioning measurement values based at least partly on the one or more first reference signals and the message; determining time difference information between a reception time of the one or more first reference signals and a transmission time of the one or more second reference signals; and transmitting a report indicating the one or more positioning measurement values and the time difference information.

According to another aspect, there is provided an apparatus comprising at least one processor, and at least one memory including computer program code, wherein the at least one memory and the computer program code are configured, with the at least one processor, to cause the apparatus to: transmit one or more first reference signals on one or more transmission occasions within a time window; receive one or more second reference signals; perform, based at least partly on the one or more second reference signals, one or more transmission timing changes on at least one of the one or more transmission occasions, on which the one or more first reference signals are transmitted; and transmit a message comprising at least a first vector, wherein the first vector comprises one or more values indicating the one or more transmission timing changes.

According to another aspect, there is provided an apparatus comprising means for: transmitting one or more first reference signals on one or more transmission occasions within a time window; receiving one or more second reference signals; performing, based at least partly on the one or more second reference signals, one or more transmission timing changes on at least one of the one or more transmission occasions, on which the one or more first reference signals are transmitted; and transmitting a message comprising at least a first vector, wherein the first vector comprises one or more values indicating the one or more transmission timing changes.

According to another aspect, there is provided a method comprising: transmitting one or more first reference signals on one or more transmission occasions within a time window; receiving one or more second reference signals; performing, based at least partly on the one or more second reference signals, one or more transmission timing changes on at least one of the one or more transmission occasions, on which the one or more first reference signals are transmitted; and transmitting a message comprising at least a first vector, wherein the first vector comprises one or more values indicating the one or more transmission timing changes.

According to another aspect, there is provided a computer program comprising instructions for causing an apparatus to perform at least the following: transmitting one or more first reference signals on one or more transmission occasions within a time window; receiving one or more second reference signals; performing, based at least partly on the one or more second reference signals, one or more transmission timing changes on at least one of the one or more transmission occasions, on which the one or more first reference signals are transmitted; and transmitting a message comprising at least a first vector, wherein the first vector comprises one or more values indicating the one or more transmission timing changes.

According to another aspect, there is provided a computer program product comprising program instructions which, when run on a computing apparatus, cause the computing apparatus to perform at least the following: transmitting one or more first reference signals on one or more transmission occasions within a time window; receiving one or more second reference signals; performing, based at least partly on the one or more second reference signals, one or more transmission timing changes on at least one of the one or more transmission occasions, on which the one or more first reference signals are transmitted; and transmitting a message comprising at least a first vector, wherein the first vector comprises one or more values indicating the one or more transmission timing changes.

According to another aspect, there is provided a computer readable medium comprising program instructions for causing an apparatus to perform at least the following: transmitting one or more first reference signals on one or more transmission occasions within a time window; receiving one or more second reference signals; performing, based at least partly on the one or more second reference signals, one or more transmission timing changes on at least one of the one or more transmission occasions, on which the one or more first reference signals are transmitted; and transmitting a message comprising at least a first vector, wherein the first vector comprises one or more values indicating the one or more transmission timing changes.

According to another aspect, there is provided a non-transitory computer readable medium comprising program instructions for causing an apparatus to perform at least the following: transmitting one or more first reference signals on one or more transmission occasions within a time window; receiving one or more second reference signals; performing, based at least partly on the one or more second reference signals, one or more transmission timing changes on at least one of the one or more transmission occasions, on which the one or more first reference signals are transmitted; and transmitting a message comprising at least a first vector, wherein the first vector comprises one or more values indicating the one or more transmission timing changes.

According to another aspect, there is provided an apparatus comprising at least one processor, and at least one memory including computer program code, wherein the at least one memory and the computer program code are configured, with the at least one processor, to cause the apparatus to: transmit a message indicating one or more rules for recording and indicating one or more transmission timing changes on one or more transmission occasions of one or more first reference signals within a time window.

According to another aspect, there is provided an apparatus comprising means for: transmitting a message indicating one or more rules for recording and indicating one or more transmission timing changes on one or more transmission occasions of one or more first reference signals within a time window.

According to another aspect, there is provided a method comprising: transmitting a message indicating one or more rules for recording and indicating one or more transmission timing changes on one or more transmission occasions of one or more first reference signals within a time window.

According to another aspect, there is provided a computer program comprising instructions for causing an apparatus to perform at least the following:

According to another aspect, there is provided a computer program product comprising program instructions which, when run on a computing apparatus, cause the computing apparatus to perform at least the following: transmitting a message indicating one or more rules for recording and indicating one or more transmission timing changes on one or more transmission occasions of one or more first reference signals within a time window.

According to another aspect, there is provided a computer readable medium comprising program instructions for causing an apparatus to perform at least the following: transmitting a message indicating one or more rules for recording and indicating one or more transmission timing changes on one or more transmission occasions of one or more first reference signals within a time window.

According to another aspect, there is provided a non-transitory computer readable medium comprising program instructions for causing an apparatus to perform at least the following: transmitting a message indicating one or more rules for recording and indicating one or more transmission timing changes on one or more transmission occasions of one or more first reference signals within a time window.

According to another aspect, there is provided a system comprising at least a location management function, a first network element, and a second network element of a wireless communication network. The location management function is configured to: transmit, to the first network element, a message indicating one or more rules for recording and indicating one or more transmission timing changes on one or more transmission occasions of one or more first reference signals within a time window. The first network element is configured to: receive, from the location management function, the message indicating the one or more rules; transmit, to the second network element, one or more first reference signals on one or more transmission occasions within a time window; receive, from the second network element, one or more second reference signals; perform, based at least partly on the one or more second reference signals, one or more transmission timing changes on at least one of the one or more transmission occasions, on which the one or more first reference signals are transmitted; and transmit, to the second network element, according to the one or more rules, a message comprising at least a first vector, wherein the first vector comprises one or more values indicating the one or more transmission timing changes. The second network element is configured to: receive, from the first network element, the one or more first reference signals; transmit, to the first network element, the one or more second reference signals; receive, from the first network element, the message comprising at least the first vector; determine one or more positioning measurement values based at least partly on the one or more first reference signals and the message comprising at least the first vector; determine time difference information between a reception time of the one or more first reference signals and a transmission time of the one or more second reference signals; and transmit, to the first network element or to the location management function, a report indicating the one or more positioning measurement values and the time difference information.

According to another aspect, there is provided a system comprising at least a location management function, a first network element, and a second network element of a wireless communication network. The location management function comprises means for: transmitting, to the first network element, a message indicating one or more rules for recording and indicating one or more transmission timing changes on one or more transmission occasions of one or more first reference signals within a time window. The first network element comprises means for: receiving, from the location management function, the message indicating the one or more rules; transmitting, to the second network element, one or more first reference signals on one or more transmission occasions within a time window; receiving, from the second network element, one or more second reference signals; performing, based at least partly on the one or more second reference signals, one or more transmission timing changes on at least one of the one or more transmission occasions, on which the one or more first reference signals are transmitted; and transmitting, to the second network element, according to the one or more rules, a message comprising at least a first vector, wherein the first vector comprises one or more values indicating the one or more transmission timing changes. The second network element comprises means for: receiving, from the first network element, the one or more first reference signals; transmitting, to the first network element, the one or more second reference signals; receiving, from the first network element, the message comprising at least the first vector; determining one or more positioning measurement values based at least partly on the one or more first reference signals and the message comprising at least the first vector; determining time difference information between a reception time of the one or more first reference signals and a transmission time of the one or more second reference signals; and transmitting, to the first network element or to the location management function, a report indicating the one or more positioning measurement values and the time difference information.

BRIEF DESCRIPTION OF THE DRAWINGS

In the following, various exemplary embodiments will be described in greater detail with reference to the accompanying drawings, in which

FIGS. 6-9 illustrate flow charts according to some exemplary embodiments;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
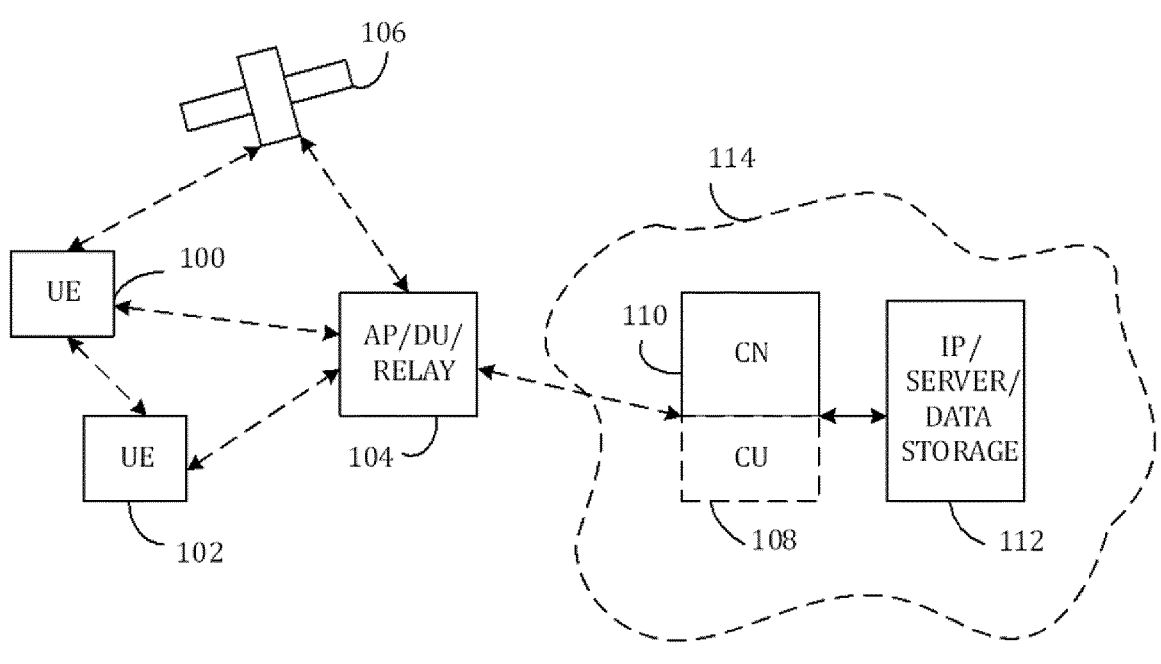
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell. The physical link from a user device to a (e/g) NodeB may be called uplink or reverse link and the physical link from the (e/g) NodeB to the user device may be called downlink or forward link. It should be appreciated that (e/g) NodeBs or their functionalities may be implemented by using any node, host, server or access point etc. entity suitable for such a usage.

A communication system may comprise more than one (e/g) NodeB, in which case the (e/g) NodeBs may also be configured to communicate with one another over links, wired or wireless, designed for the purpose. These links may be used for signaling purposes. The (e/g) NodeB may be a computing device configured to control the radio resources of communication system it is coupled to. The (e/g) NodeB may also be referred to as a base station, an access point or any other type of interfacing device including a relay station capable of operating in a wireless environment. The (e/g) NodeB may include or be coupled to transceivers. From the transceivers of the (e/g) NodeB, a connection may be provided to an antenna unit that establishes bi-directional radio links to user devices. The antenna unit may comprise a plurality of antennas or antenna elements. The (e/g) NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, mobility management entity (MME), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may also comprise other apparatuses, such as physical layer relay nodes or other network elements, etc. At least one of the (e/g) NodeBs or may be a Home (e/g) nodeB.

Furthermore, the (e/g) nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g) nodeB or base station. The DU may be defined as a logical node hosting radio link control (RLC), medium access control (MAC) and/or physical (PHY) layers of the (e/g) nodeB or base station. The operation of the DU may be at least partly controlled by the CU. The CU may comprise a control plane (CU-CP), which may be defined as a logical node hosting the RRC and the control plane part of the PDCP protocol of the CU for the (e/g) nodeB or base station. The CU may further comprise a user plane (CU-UP), which may be defined as a logical node hosting the user plane part of the PDCP protocol and the SDAP protocol of the CU for the (e/g) nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g) NodeBs may be introduced. A network which may be able to use "plug-and-play" (e/g) NodeBs, may include, in addition to Home (e/g) NodeBs (H (e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Positioning techniques may be used to estimate a physical location of a UE. For example, the following positioning techniques may be used in NR: downlink time difference of arrival (DL-TDoA), uplink time difference of arrival (UL-TDoA), downlink angle of departure (DL-AoD), uplink angle of arrival (UL-AoA), and/or multi-cell round trip time (multi-RTT). The positioning reference signal (PRS) and sounding reference signal (SRS) may be used as reference signals for estimating the location of the UE. PRS is a reference signal for positioning in the downlink (DL). SRS is a reference signal that may be used for positioning in the uplink (UL). It should be noted that SRS may also be used for other purposes than positioning. In NR system, there are two types of SRS and those SRS are separately configured to a UE from a gNB. One is SRS for MIMO introduced in Rel-15 and another one is SRS for positioning purpose which has been introduced in Rel-16 where SRS for MIMO can also be used for positioning.

In downlink positioning techniques, such as DL-TDoA and DL-AoD, the UE may measure the PRS from multiple gNBs. The UE may measure, for example, the reference signal time difference (RSTD) and/or reference signal received power (PRS-RSRP). These measurements may then be used to assist in estimating the location of the UE. The UE may report these measurements to the location management function (LMF), if the LMF is the entity estimating the location.

In downlink and uplink positioning techniques, the UE may measure the time difference between the reception time of PRS and the transmission time of SRS, wherein the PRS may be received from multiple transmission and reception points (TRPs) or gNBs, and the SRS may be transmitted to multiple TRPs or gNBs. The UE may report these measurements to the LMF.

It is desirable to improve the positioning accuracy of these techniques in order to estimate the UE location more accurately. The positioning accuracy of these techniques may be improved by mitigating UE Rx/Tx and/or gNB Rx/Tx timing delays. Rx refers to reception and Tx refers to transmission herein.

From a signal transmission perspective, there may be a time delay from the time when the digital signal is generated at baseband to the time when the radio frequency (RF) signal is transmitted from the Tx antenna. For supporting positioning, the TRP or UE may implement an internal calibration, or compensation, of the Tx time delay for the transmission of the DL PRS or UL SRS signals, which may also include the calibration, or compensation, of the relative time delay between different RF chains in the same TRP or UE. The TRP may refer to, for example, a gNB or a remote radio head (RRH) of a gNB. The compensation may also possibly consider the offset of the Tx antenna phase center to the physical antenna center. However, the calibration may not be perfect. The remaining Tx time delay after the calibration, or the uncalibrated Tx time delay, may be defined as the Tx timing error.

From a signal reception perspective, there may be a time delay from the time when the RF signal arrives at the Rx antenna to the time when the signal is digitized and time-stamped at the baseband. For supporting positioning, the UE or TRP may implement an internal calibration, or compensation, of the Rx time delay before it reports the measurements that are obtained from the DL PRS or UL SRS signals, which may also include the calibration, or compensation, of the relative time delay between different RF chains in the same UE or TRP. The compensation may also possibly consider the offset of the Rx antenna phase center to the physical antenna center. However, the calibration may not be perfect. The remaining Rx time delay after the calibration, or the uncalibrated Rx time delay, may be defined as the Rx timing error.

A timing error group (TEG) may be identified with an identifier (ID) and a certain error range, such as [0, X ns]. For example, if the UE is equipped with two Tx antenna panels, each antenna panel may have different error ranges. In this case, there may be two different Tx TEGs, such that Tx TEG #1: [0, 5 ns] and Tx TEG #2: [0, 10 ns] (as a non-limiting example). If SRS resource #1, #2, and #3 are transmitted by a specific Tx antenna panel, they may have the same Tx timing error range, and so they may be associated with a specific Tx TEG such as Tx TEG #1.

A UE Tx TEG may be associated with the transmissions of one or more UL SRS resources, which have the Tx timing errors within a certain margin, where the SRS is for MIMO SRS or positioning SRS. Also, a UE Tx TEG may be associated with the transmissions of one or more sidelink reference signals, which have the Tx timing errors within a certain margin.

A TRP Tx TEG may be associated with the transmissions of one or more DL RS resources, which have the Tx timing errors within a certain margin, where the DL RS can be DL PRS.

A UE Rx TEG may be associated with one or more DL measurements, which have the Rx timing errors within a certain margin.

A TRP Rx TEG may be associated with one or more UL measurements, which have the Rx timing errors within a certain margin.

A UE RxTx TEG may be associated with one or more UE Rx-Tx time difference measurements and one or more UL SRS resources, which have the sum of the Rx timing error and the Tx timing error within a certain margin, where the SRS is for MIMO SRS or positioning SRS. Also, a UE RxTx TEG may be associated with one or more UE Rx-Tx time difference measurements and one or more sidelink reference signals, which have the sum of the Rx timing error and the Tx timing error within a certain margin.

A TRP RxTx TEG may be associated with one or more gNB Rx-Tx time difference measurements and one or more DL reference signal resources, which have the sum of the Rx timing error and the Tx timing error within a certain margin. The DL reference signal may refer to DL PRS, for example.

Figure 2:
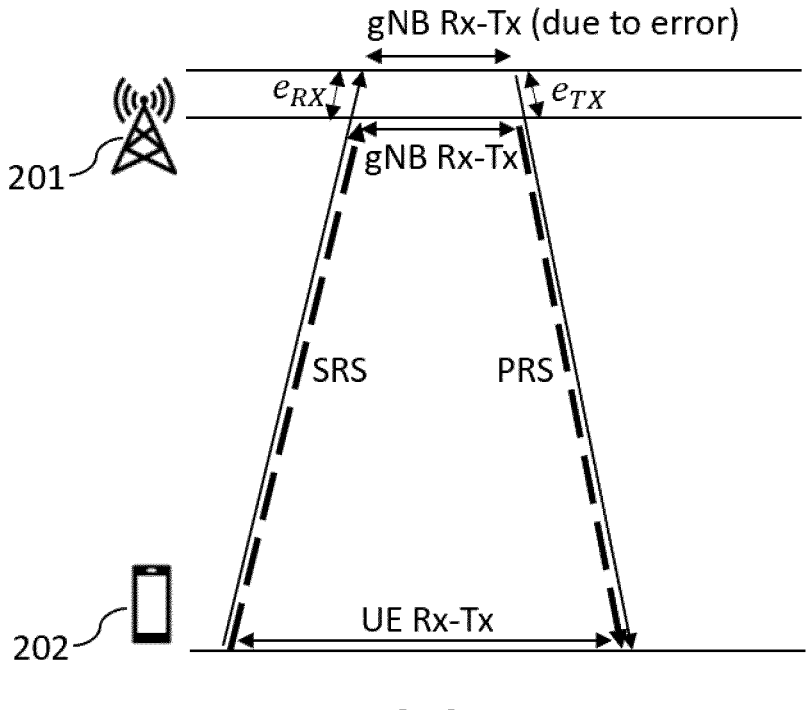
FIG. 2 illustrates an example of reception timing error and transmission timing error.

FIG. 2 illustrates an example of Rx timing error and Tx timing error. A gNB 201 may transmit a PRS resource to a UE 202 in the downlink (i.e., the UE is the receiver of the PRS resource). The UE 202 may transmit an SRS resource to the gNB 201 in the uplink (i.e., the gNB is the receiver of the SRS resource). The gNB may transmit the PRS resource and receive the SRS resource via a TRP, such as a remote radio head (RRH) of the gNB. The actual gNB Rx-Tx time difference and the gNB Rx-Tx time difference due to the error may have different values, i.e., there may be a measurement error due to the Rx and Tx timing errors.

In FIG. 2, $e_{RX}$ represents Rx timing error from the TRP side, and $e_{TX}$ denotes Tx timing error from the TRP side. The sum of the Rx timing error and the Tx timing error may be defined as $e_{RX}+e_{TX}$. In addition, based on this definition, TRP RxTx TEG means that $e_{RX}+e_{TX}$ has a specific error range value, such as [0, 3 ns], and a specific identifier (ID), for example TRP RxTx TEG ID #1.

Figure 3:
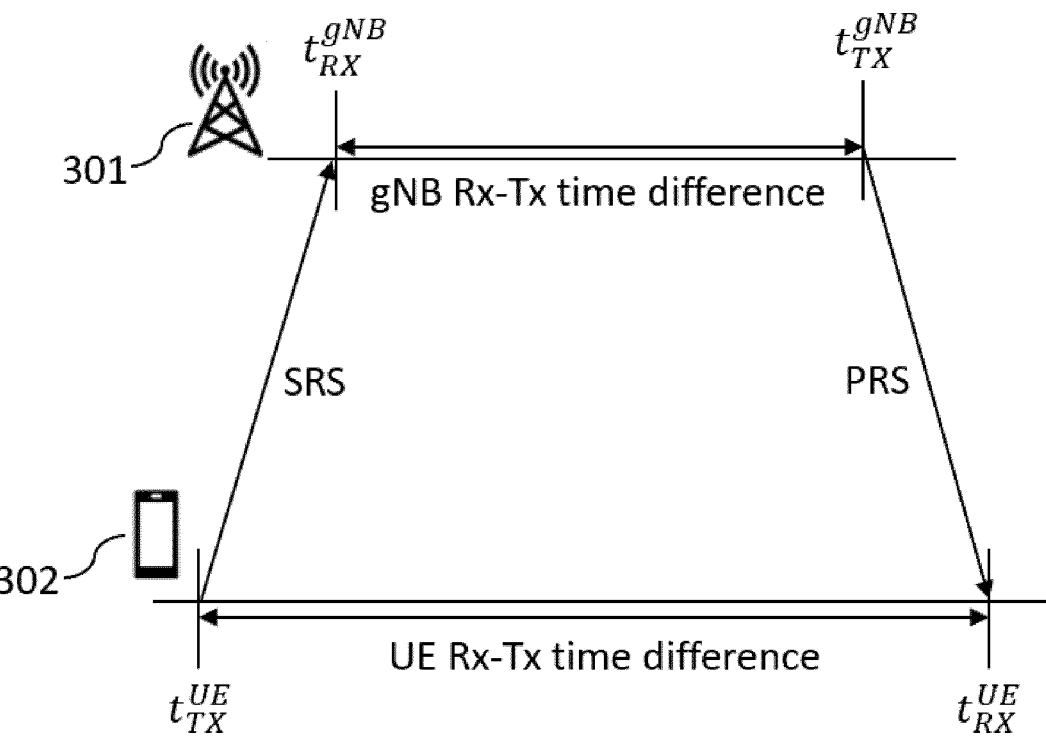
FIG. 3 illustrates an example of time difference between reception and transmission.

FIG. 3 illustrates an example of UE Rx-Tx time difference and gNB Rx-Tx time difference. A gNB 301 may transmit a PRS resource to a UE 302 in the downlink (i.e., the UE is the receiver of the PRS resource). The UE 302 may transmit an SRS resource to the gNB 301 in the uplink (i.e., the gNB is the receiver of the SRS resource). The gNB Rx-Tx time difference may be defined as $$t_{RX}^{gNB} - t_{TX}^{gNB},$$

where $$t_{RX}^{gNB}$$

is the gNB's reception time of the SRS resource, and $$t_{TX}^{gNB}$$

is the gNB's transmission time of the PRS resource. The UE Rx-Tx time difference may be defined as $$t_{RX}^{UE} - t_{TX}^{UE},$$

where $$t_{RX}^{UE}$$

is the UE's reception time of the PRS resource, and $$t_{TX}^{UE}$$

is the UE's transmission time of the SRS resource. The UE may report the UE Rx-Tx time difference to the LMF, and the gNB may report the gNB Rx-Tx time difference to the LMF. The LMF may then calculate the round trip time (RTT) based on the reports, where the RTT may be defined as $$t_{RX}^{gNB} - t_{TX}^{gNB} + t_{RX}^{UE} - t_{TX}^{UE}.$$

For mitigating UE Tx timing errors for UL TDoA, one of the following two options may be supported. In a first option, subject to UE capability, the UE may provide association information of UL SRS resources for positioning with Tx TEGs directly to the LMF, if the UE has multiple Tx TEGs. The association information refers to an association between one or more specific SRS resources and a specific Tx TEG. For example, SRS resources #1, #2 and #3 may be associated with Tx TEG #1, if the UE transmits those three SRS resources using the same Tx antenna panel or RF chain. The LMF may forward the association information provided by the UE to the serving and neighboring gNBs. In a second option, subject to UE capability, the UE may provide the association information of UL SRS resources for positioning with Tx TEGs to the serving gNB, if the UE has multiple Tx TEGs. The serving gNB may forward the association information provided by the UE to the LMF. The LMF may forward the association information from the serving gNB to the neighboring gNBs. The UE may report capability information related to Tx TEGs to the LMF via LTE positioning protocol (LPP) signaling. It should be noted that LPP signaling may be used by both LTE UEs and NR UEs. The gNB may report the associated SRS resource ID, or resource set ID, of the relative time of arrival (RToA) measurement to the LMF via NR positioning protocol a (NRPPa) signaling.

Regarding how to let the LMF know the UE Tx timing error value for each Tx TEG, there may be two ways. The first way is that the TRP or reference device(s) estimates each Tx TEG of the UE, or estimates the time error difference between Tx TEG, and provides Tx time error information of the UE to the LMF. The reference device may be a UE or a TRP, the location of which is accurately known to the LMF. The second way is that the UE provides its Tx time error information directly to the LMF via LPP signaling.

In addition, for mitigating UE Rx/Tx timing errors for the multi-RTT technique, the UE Tx TEG ID may be associated with an UL SRS resource corresponding to the Tx timing of the UE Rx-Tx measurement, or the UE Tx TEG ID may be associated with the Tx timing of the UE Rx-Tx measurement. The UE Tx TEG ID may be associated with one or more UL SRS resources. A UE Rx TEG ID may be associated with one or more DL PRS resources corresponding to the Rx time of the measurement.

In Release 17 (Rel-17) NR positioning, the UE and TRP may report multiple measurements to the LMF in a single measurement report. For example, the UE may report positioning measurements, such as reference signal time difference (RSTD), DL reference signal received power (RSRP), phase, angle, and/or UE Rx-Tx time difference. Similarly, the TRP may report positioning measurements such as RToA, UL RSRP, phase, angle, and/or gNB Rx-Tx time difference. Reporting multiple measurements in a single measurement report may be referred to as batch reporting. Each measurement instance may be reported with its own timestamp. A measurement instance refers to one or more measurements, which may be the same type or different types, which are obtained from the same DL PRS resource (s), or the same UL SRS resource(s).

The LMF may configure a measurement time window for the UE and/or gNB. Each UE measurement instance may be configured with a number of instances of the DL-PRS resource set. Each TRP measurement instance may be configured with a number of SRS measurement time occasions. For the multi-RTT technique, the LMF may obtain an aligned measurement of the UE Rx-Tx time difference and the gNB Rx-Tx time difference, so that it may calculate the round trip time (RTT) measurement more accurately.

Reporting of one UL-RTOA and multiple UL-AoA measurements for the first arrival path per SRS resource for positioning and per SRS resource for MIMO in a single gNB report to LMF may be possible. The above measurements may be associated with an SRS resource ID, which is also reported to the LMF.

Furthermore, reporting of one gNB Rx-Tx time difference and multiple UL-AoA measurements for the first arrival path per SRS resource for positioning in a single gNB report to the LMF may also be possible.

As mentioned previously, RxTx TEG may be determined by the sum of the Rx timing error and the Tx timing error. One of the advantages of introducing RxTx TEG is to reduce signaling overhead in comparison to separately reporting Rx TEG and Tx TEG. It also simplifies the LMF behavior, since the LMF just needs to calibrate the Rx-Tx time difference measurement by using the RxTx TEG.

In the case of UE RxTx TEG, the UE may maintain a certain RxTx TEG rather than a specific Tx TEG and/or Rx TEG in a way that the UE changes the transmission timing considering the reception timing error. In addition, the UE may maintain a stricter error range of a certain RxTx TEG than the error range of Tx TEG and/or Rx TEG in a way that UE changes the transmission timing considering the reception timing error. In other words, the UE can maintain the RxTx TEG by changing the transmission timing of SRS based on the received signal and associated processing. Similarly, a TRP can maintain a TRP RxTx TEG by changing the transmission timing of PRS based on the received signal and associated processing.

In consideration of the batch reporting feature mentioned above, the LMF may request the TRP to report RToA, gNB Rx-Tx time difference, RSRP, and/or AoA for specific SRS resource(s) and/or PRS resource(s). Similarly, the LMF may indicate the UE to report RSTD, UE Rx-Tx time difference, and/or RSRP for specific PRS resource(s) and/or SRS resource(s). Also, the LMF may configure a measurement time window with a duration of T ms, where a number of PRS or SRS occasions are included in this window. The UE may transmit a specific SRS resource via the same Tx antenna, and the SRS resource may be associated with a specific UE Tx TEG. This Tx TEG may have an error range of [0, X1 ns]. The UE RxTx TEG for UE Rx-Tx time difference measurement may have an error range of [0, X2 ns], where X2<X1. During the configured measurement time window, the UE may measure RSRP, RSTD, and the Rx-Tx time difference. While the UE is measuring the reference signals, the UE may try to maintain the same RxTx TEG by adjusting the transmission timing within a certain range. The reason to maintain the same RxTx TEG is to provide a high accuracy of the multi-RTT positioning technique. However, it is noted that the transmission timing change of the UE is different than the timing advance change performed according to an indication from the network and/or autonomously by the UE. The transmission timing change may be a smaller value compared to the current timing advance granularity.

The transmission timing change to maintain the same RxTx TEG may be helpful for the UE, since dynamic update of RxTx TEG is not necessary and it is helpful for the LMF to calculate the RTT measurement more accurately, and it does not affect other measurements at the UE side. This UE behavior also does not harm the gNB measurements to obtain the RSRP, gNB Rx-Tx, and angle measurements.

However, the UE may not know whether the gNB is also measuring RToA in addition to the gNB Rx-Tx time difference, since the NRPPa signaling between the gNB and the LMF is not known to the UE. The RToA measurement performance is directly affected by the transmission timing change performed by the UE, and the LMF may not be able to calibrate the RToA measurements of the gNB. More specifically, the gNB measures RToA across N SRS occasions within the configured time window, obtains N (>1) RToA measurement samples, and determines a single RToA value to report to the LMF. Even if the UE changes transmission timing to maintain a timing error of RxTx TEG for one or more transmission occasions for a total of N transmission occasions, it is difficult for the LMF to appropriately calibrate the RToA measurements. In other words, the accuracy of the RToA measurement at the gNB may be degraded in a single report comprising RToA and gNB Rx-Tx time difference measurements.

There is a similar problem regarding the similar behavior at the gNB side. In the configured measurement time window, the gNB may measure RSRP, RToA and gNB Rx-Tx time difference. While the gNB is performing positioning measurements of the UL and DL reference signals, the gNB may try to maintain the same RxTx TEG by adjusting the transmission timing within a certain range. This transmission timing change may be helpful for the LMF to compensate for errors in the gNB Rx-Tx time difference measurement. If the gNB maintains a nearly constant error value of the gNB RxTx TEG, the LMF may compensate for the error included in the gNB Rx-Tx time difference measurement based on the calibration information on RxTx TEG. In addition, the transmission timing change at the gNB does not harm the UE Rx-Tx time difference or RSRP measurements.

However, the gNB may not know whether the UE is also measuring RSTD in addition to the UE Rx-Tx time difference, since the LPP signaling between the UE and LMF is transparent to the gNB. The RSTD measurements of the UE are directly affected by the transmission timing change performed by the gNB, and the LMF may not be able to appropriately calibrate the RSTD measurements included in a single report comprising RSTD and UE Rx-TX time difference measurements. In other words, the accuracy of the RSTD measurement at the UE may be degraded in a single report comprising RSTD and UE Rx-Tx time difference measurements.

Some exemplary embodiments address the RSTD and RToA measurement degradation problem in the batch reporting case, where the LMF requests a gNB to report at least RToA and gNB Rx-Tx in a single report, and the LMF indicates a UE to report at least RSTD and UE Rx-Tx time difference in a single report.

Figure 4:
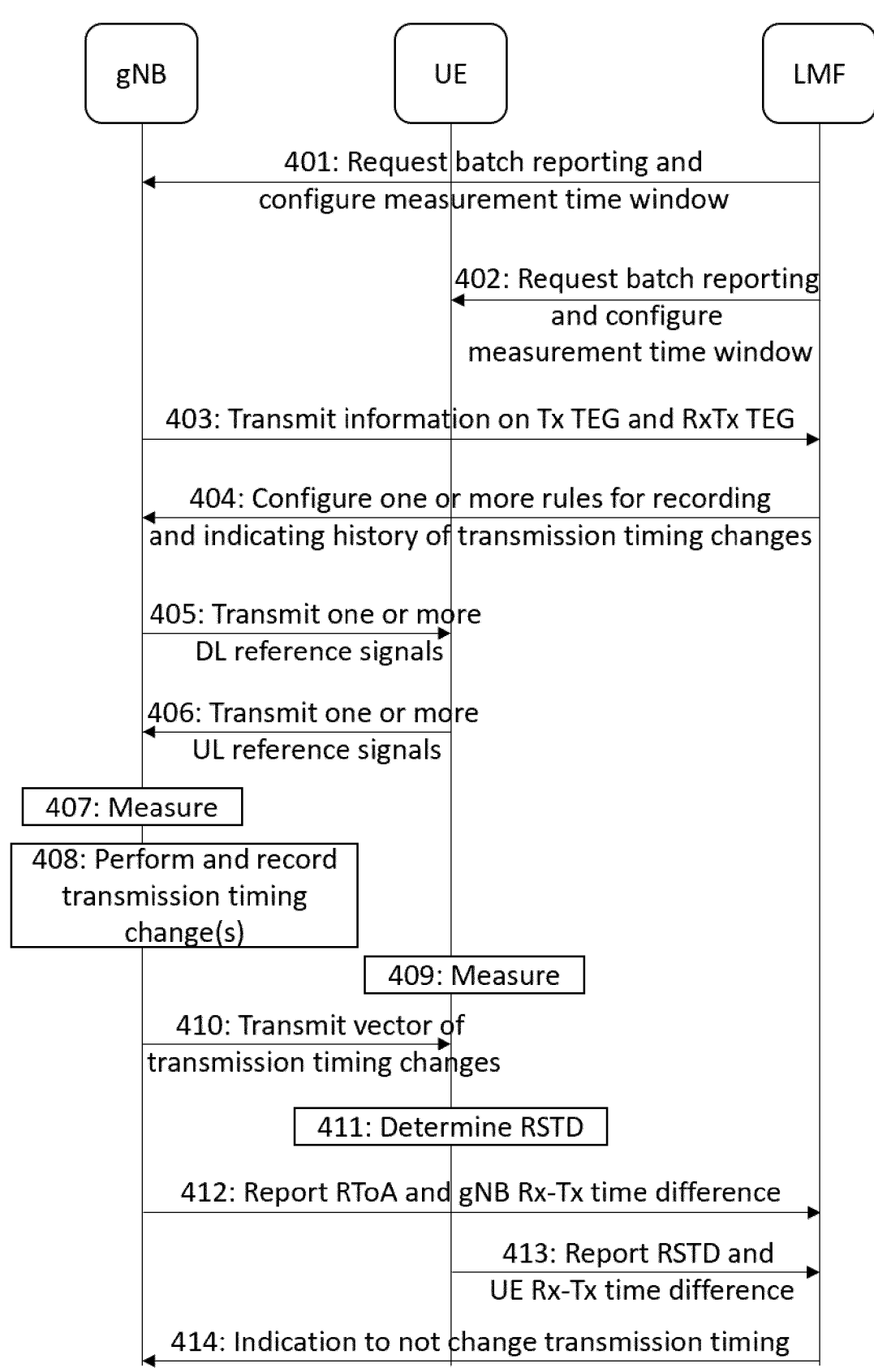
FIGS. 4-5 illustrate signaling diagrams according to some exemplary embodiments.

FIG. 4 illustrates a signaling diagram according to an exemplary embodiment. Referring to FIG. 4, an LMF transmits 401, to a base station such as a gNB, a request for batch reporting and configuration information indicating/configuring a measurement time window for positioning measurements. The request for batch reporting means that the LMF requests the gNB to include at least gNB Rx-Tx time difference and RToA in a single report, when the gNB reports positioning measurements. The measurement time window may include one or more transmission occasions of a DL reference signal and/or an UL reference signal.

The LMF transmits 402, to a UE, a request for batch reporting and configuration information indicating/configuring the measurement time window. The request for batch reporting means that the LMF indicates the UE to include at least UE Rx-Tx time difference and RSTD in a single report, when the UE reports positioning measurements. The measurement time window may include one or more transmission occasions of a DL reference signal and/or an UL reference signal. The measurement time window configured to the UE may be the same as the measurement time window configured to the gNB. Alternatively, the UE and the gNB may be configured with different measurement time windows.

The gNB transmits 403, to the LMF, information on Tx TEG and RxTx TEG.

The LMF transmits 404, to the gNB, configuration information comprising one or more rules for recording and indicating history information of transmission timing changes of one or more DL reference signals within the measurement time window. The history information of the transmission timing change may be configured as a first vector comprising one or more values indicating one or more transmission timing changes associated with one or more transmission occasions within a time window. In other words, the one or more rules may instruct the gNB to indicate the history of transmission timing changes to the UE and/or to the LMF in the first vector. The one or more rules may comprise at least one threshold value for the transmission timing changes. The configuration information 404 may be transmitted from the LMF to the gNB by using NRPPa signaling, for example. The configuration information 404 may also be transmitted from the LMF to the UE via LPP signaling in order to help the UE interpret the history of transmission timing changes indicated by the gNB.

The gNB transmits 405, to the UE, via one or more TRPs, one or more DL reference signals on one or more transmission occasions within the measurement time window, wherein the one or more DL reference signals are associated with a specific TRP Tx TEG. The DL reference signal may refer to, for example, a PRS resource or any other DL reference signal.

The UE transmits 406, to the gNB, one or more UL reference signals on one or more transmission occasions within the measurement time window. The one or more transmission occasions of the one or more UL reference signals may be different than the one or more transmission occasions of the one or more DL reference signals. The one or more UL reference signals may be associated with a specific UE Tx TEG. The UL reference signal may refer to, for example, an SRS resource or any other UL reference signal.

The gNB measures 407 the one or more UL reference signals in order to obtain a plurality of measurement samples for determining RToA and gNB Rx-Tx time difference. The gNB Rx-Tx time difference refers to a time difference between a reception time of the one or more UL reference signals and a transmission time of the one or more DL reference signals.

While the gNB is performing the measurement, the gNB may try to maintain the same RxTx TEG by adjusting the transmission timing on at least one transmission occasion of the one or more DL reference signals. The gNB performs 408 and records, according to the one or more rules configured by the LMF, one or more transmission timing changes on at least one of the one or more transmission occasions of the one or more DL reference signals within the measurement time window. The gNB may perform the one or more transmission timing changes based at least partly on the reception time of the one or more UL reference signals.

For example, for a total of N (e.g., N≥2) transmission occasions of a specific PRS resource, the gNB (or TRP) may change transmission timing at the n-th transmission occasion for the PRS resource to maintain the specific TRP RxTx TEG, where n is a natural number less than or equal to N. Compared to the transmission timing of the first PRS transmission occasion (i.e., initial transmission occasion) within the configured measurement time window, the gNB may record the history of the transmission timing change for N transmission occasions for example in a vector $x=[x_1, x_2, \ldots, x_N]$, where $x_N$ is a transmission timing change value for the N-th transmission occasion of the PRS resource compared to the transmission timing of the first transmission occasion (i.e., initial transmission occasion) of the PRS resource. In other words, the values in the vector may indicate an amount of transmission timing change at each transmission occasion. Each of the one or more values in the vector may be less than or equal to one.

If the gNB (or TRP) did not intentionally change transmission timing for the PRS resource, the gNB (or TRP) may determine $x_n=1$. The factor $x_n$ is a weight factor. If the gNB (or TRP) determines $x_n=1$, it may indicate to the UE that there was no intentional transmission timing change for this specific PRS resource. In other words, a specific value (referred to as a first value) of the one or more values may indicate no transmission timing change for a specific transmission occasion compared to the transmission timing of a first transmission occasion (initial transmission occasion) of the one or more DL reference signals. The first value (i.e., the specific value) may be a pre-determined value. In one example, when the first value equals one, the first value indicates that there is no transmission timing change for a specific transmission occasion. However, the first value may be a pre-determined value other than one. In another example, when the first value equals zero, the first value indicates that there is no transmission timing change for a specific transmission occasion.

For example, at a certain PRS transmission occasion, if the TRP does not need to change the transmission timing to guarantee the TRP RxTx TEG, the TRP may transmit the PRS resource without intentional/deliberate transmission timing change (compared to the first transmission occasion) to maintain a certain RxTx TEG. In this case, the UE does not need the additional calibration of propagation time measurement obtained from this TRP. However, this does not mean that the UE does not need any calibration to calculate the RSTD measurement. If the UE used two different Rx antenna panels in order to receive two PRS resources, the UE may need to calibrate the Rx timing error included in the propagation time measurement before calculating RSTD considering the Rx TEG information of each Rx antenna panel.

Another value (referred to as a second value) of the one or more values may indicate an amount of transmission timing change for a specific transmission occasion compared to the transmission timing of the first transmission occasion (initial transmission occasion) of the one or more DL reference signals. In other words, the second value may indicate that the transmission timing for a certain transmission occasion has been changed in comparison to the first transmission occasion (initial transmission occasion). The second value may be a pre-determined value.

In one example, when the second value is less than one (but greater than or equal to zero), the second value indicates the amount of transmission timing change (the first value may be equal to one in this example). In this example, the smaller the second value is, the larger the indicated transmission timing change may be.

In another example, when the second value is greater than zero (but less than or equal to one), the second value indicates the amount of transmission timing change (the first value may be equal to zero in this example). In this example, the larger the second value is, the larger the indicated transmission timing change may be.

It should be noted that the terms 'first value' and 'second value' are used herein to distinguish the values, and they do not necessarily mean a specific order of the values in the vector.

For example, if the TRP Tx TEG associated with the PRS resource is not changed, i.e., the amount of transmission timing change is not large, the gNB (or TRP) may determine $x_n=a$, where $0 \leq a \leq 1$.

In one example, if the TRP Tx TEG associated with the PRS resource is changed, the gNB (or TRP) may determine $x_n=b$, where $b \leq a$. In another example, if the TRP Tx TEG associated with the PRS resource is changed, the gNB (or TRP) may determine $x_n=b$, where $a \leq b$. The Tx TEG associated with the PRS resource may be changed only for the n-th transmission occasion, or the changed timing may also be maintained for one or more subsequent transmission occasions.

The UE measures 409 the one or more DL reference signals in order to obtain a plurality of measurement samples for determining RSTD and UE Rx-Tx time difference. The UE Rx-Tx time difference refers to a time difference between a reception time of the one or more DL reference signals and a transmission time of the one or more UL reference signals.

The gNB transmits 410, to the UE, a message comprising at least one vector $x=[x_1, x_2, \ldots, x_N]$ associated with the one or more DL reference signals and the measurement time window, wherein the at least one vector comprises one or more values indicating the one or more transmission timing changes performed by the gNB. The at least one vector x may comprise at least the first vector. The message 410 may further comprise at least one of: a resource identifier associated with the DL reference signal (e.g., a PRS resource identifier), an identifier associated with the measurement time window, and/or an identifier associated with a RxTx TEG. The PRS resource may be associated with one or more SRS resources.

The message 410 may further comprise an identifier associated with at least one UL reference signal (e.g., SRS resource identifier), based on which the one or more transmission timing changes are performed. Thus, the gNB may inform the UE about the specific UL reference signal resource at a certain occasion that caused the gNB to change the transmission timing.

The UE determines 411, or calculates, an RSTD value based at least partly on the one or more DL signals and the message 410 received from the gNB by taking into account the transmission timing history vector (e.g., the history information of the transmission timing changes) indicating the history of the one or more transmission timing changes performed by the gNB. For example, when the UE calculates the propagation time to determine the RSTD value for a specific PRS resource by averaging a linear combination of a plurality of N measurement samples associated with the PRS resource, it may consider the transmission timing history vector $x=[x_1, x_2, \ldots, x_N]$ associated with the PRS resource.

For example, the UE may calculate the RSTD value as follows:

$$\frac{x_1^1 \times ToA_{11} + x_2^1 \times ToA_{21} + \ldots + x_N^1 \times ToA_{N1}}{N} -$$

$$\frac{x_1^2 \times ToA_{12} + x_2^2 \times ToA_{22} + \ldots + x_N^2 \times ToA_{N2}}{N},$$

where $$x_1 = \left[x_1^1, x_2^1, \ldots, x_N^1\right] \text{ and } x_2 = \left[x_1^2, x_2^2, \ldots, x_N^2\right]$$

denote transmission timing history vectors for two different DL reference signals (e.g., PRS resources), which may be transmitted N times within the measurement time window. ToA denotes time of arrival associated with a given RSTD measurement sample. In other words, the RSTD value may be determined based at least partly on a first vector $$x_1 = \left[x_1^1, x_2^1, \ldots, x_N^1\right]$$

indicating transmission timing change(s) associated with a first DL reference signal (e.g., a first PRS resource) received from a first TRP, and a second vector $$x_2 = \left[x_1^2, x_2^2, \ldots, x_N^2\right]$$

indicating transmission timing change(s) associated with a second DL reference signal (e.g., a second PRS resource) received from a second TRP. In other words, the first DL reference signal and the second DL reference signal may be received from different TRPs. Alternatively, the first DL reference signal and the second DL reference signal may be received from different antenna panels of the same TRP. The second DL reference signal may also be referred to as a third reference signal herein. The second vector may be received from the gNB in the same message as the first vector, or the two vectors may be received in separate messages.

A specific measurement sample of the plurality of measurement samples may be excluded from the averaging, if a value of a transmission timing change corresponding with the specific measurement sample is less than one. For example, the UE may exclude or discard the n-th RSTD measurement sample, if $x_n < 1$, so that X ns calibration by the LMF is valid for the RSTD measurements.

The gNB transmits 412, to the LMF, a report comprising at least the RToA and the gNB Rx-Tx time difference.

The UE transmits 413, to the LMF, a report comprising at least the determined RSTD value and the UE Rx-Tx time difference.

Based on the reports received from the UE and the gNB, the LMF may transmit 414 an indication to the gNB to not change the transmission timing of the one or more DL reference signals, or transmission timing of at least one reference signal associated with a specific TEG identifier, during a certain time window in order to prioritize TRP Tx TEG over TRP RxTx TEG for a specific TRP. In other words, based on the measurements reported by the UE and the gNB, the LMF may determine that the UE's RSTD measurement is not good enough, even though the UE has calibrated the measurement. Then, the LMF may try to prioritize the RSTD measurements.

In another exemplary embodiment, the gNB may transmit the transmission timing history vector associated with the DL reference signal to the LMF, which may use it for post-processing. In this case, the UE may be requested to report the plurality of (N) RSTD measurement samples to the LMF, and the calibration of RSTD, considering the transmission timing change(s) of the gNB (or TRP), may be done by the LMF instead of by the UE. After the LMF receives the RSTD measurement samples and the UE Rx-Tx time difference measurement, the LMF may decide to prioritize RSTD measurements, if the measurement quality or the number of multi-RTT measurements (Rx-Tx time difference measurement) is not enough. Thus, the LMF may request the gNB to measure in a certain time window without changing the transmission timing (i.e., to prioritize Tx TEG staying the same over RxTx TEG). For example, due to the coverage mismatch between SRS transmission and PRS transmission, it may be possible that the LMF could not obtain enough multi-RTT measurements. The effect of the LMF requesting the gNB to prioritize the RSTD measurement is that the LMF requests the gNB to not change the PRS transmission timing, even if the RxTx TEG could not be maintained or Rx-Tx time difference measurement could be sacrificed. Thus, the RSTD measurement is not degraded by the transmission timing change of the gNB.

Figure 5:
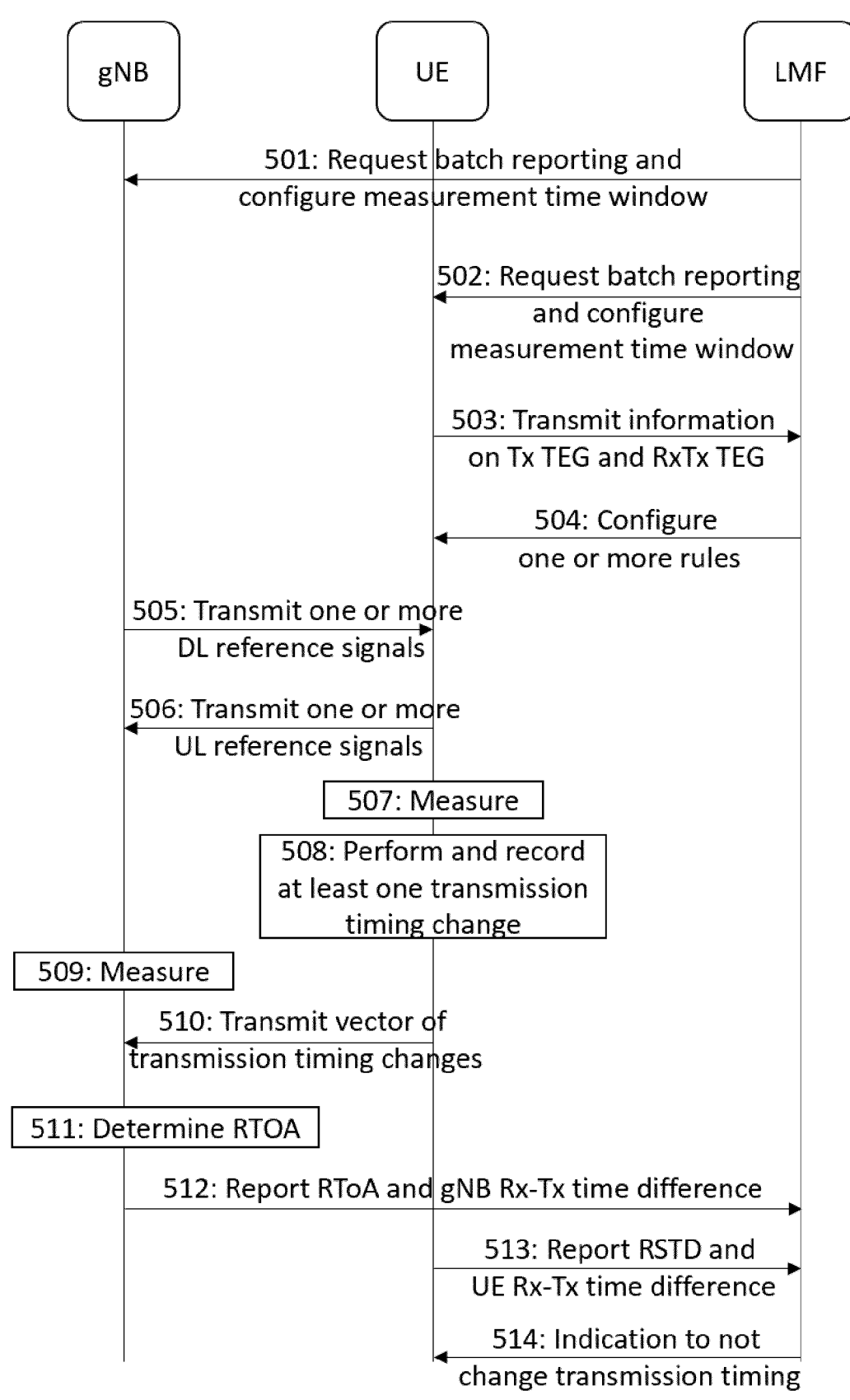

FIG. 5 illustrates a signaling diagram according to another exemplary embodiment. Referring to FIG. 5, an LMF transmits 501, to a base station such as a gNB, a request for batch reporting and configuration information indicating/configuring a measurement time window for positioning measurements. The request for batch reporting means that the LMF requests the gNB to include at least gNB Rx-Tx time difference and RToA in a single report, when the gNB reports positioning measurements. The measurement time window may include one or more transmission occasions of a DL reference signal and/or an UL reference signal.

The LMF transmits 502, to a UE, a request for batch reporting, and configuration information indicating/configuring the measurement time window. The request for batch reporting means that the LMF indicates the UE to include at least UE Rx-Tx time difference and RSTD in a single report, when the UE reports positioning measurements. The measurement time window may include one or more transmission occasions of a DL reference signal and/or an UL reference signal.

The gNB transmits 503, to the LMF, information on Tx TEG and RxTx TEG.

The LMF transmits 504, to the UE, configuration information comprising one or more rules for recording and indicating history information of transmission timing changes of one or more UL reference signals within the measurement time window. The history information of the transmission timing change may be configured as a first vector comprising one or more values indicating one or more transmission timing changes associated with one or more transmission occasions within a time window. In other words, the one or more rules may instruct the UE to indicate the history of transmission timing changes to the gNB and/or to the LMF in the first vector. The one or more rules may comprise at least one threshold value for the transmission timing changes. The configuration information 504 may be transmitted from the LMF to the UE by using LPP signaling, for example. Alternatively, the UE may receive the configuration information comprising the one or more rules from the gNB via RRC signaling. The configuration information 504 may also be transmitted from the LMF to the gNB via NRPPa signaling in order to help the gNB interpret the history of transmission timing changes indicated by the UE.

The gNB transmits 505, to the UE via one or more TRPs, one or more DL reference signals on one or more transmission occasions within the measurement time window, wherein the one or more DL reference signals are associated with a specific UE Rx TEG. The DL reference signal may refer to, for example, a PRS resource or any other DL reference signal.

The UE transmits 506, to the gNB, one or more UL reference signals on one or more transmission occasions within the measurement time window. The one or more transmission occasions of the one or more UL reference signals may be different than the one or more transmission occasions of the one or more DL reference signals. The one or more UL reference signals may be associated with a specific UE Tx TEG. The UL reference signal may refer to, for example, an SRS resource or any other UL reference signal.

The UE measures 507 the one or more DL reference signals in order to obtain a plurality of measurement samples for determining RSTD, UE Rx-Tx time difference, and/or RSRP. The UE Rx-Tx time difference refers to a time difference between a reception time of the one or more DL reference signals and a transmission time of the one or more UL reference signals.

While the UE is performing the measurement, the UE may try to maintain the same UE RxTx TEG by adjusting the transmission timing on at least one transmission occasion of the one or more UL reference signals. The UE performs 508 and records, according to the one or more rules configured by the LMF or gNB, one or more transmission timing changes on at least one of the one or more transmission occasions of the one or more UL reference signals within the measurement time window. The UE may perform the one or more transmission timing changes based at least partly on the reception time of the one or more DL reference signals.

For example, for a total of N transmission occasions of a specific SRS resource, the UE may change transmission timing at the n-th transmission occasion for the SRS resource to maintain the specific UE RxTx TEG where $n \leq N$. Compared to the transmission timing of the first SRS transmission occasion (i.e., initial transmission occasion) within the configured measurement time window, the UE may record the history of the transmission timing change for N transmission occasions for example in a vector $y=[y_1, y_2, \ldots, y_N]$, where $y_N$ is a transmission timing change value for the N-th transmission occasion of the SRS resource compared to the transmission timing of the first transmission occasion (i.e., initial transmission occasion) of the SRS resource. In other words, the values in the vector may indicate an amount of transmission timing change at each transmission occasion. Each of the one or more values in the vector may be less than or equal to one.

If the UE did not intentionally change transmission timing for the SRS resource, the UE may determine $y_n=1$. The factor $y_n$ is a weight factor. If the UE determines $y_n=1$, it may indicate to the gNB that there was no intentional transmission timing change for this specific SRS resource. In other words, a specific value (referred to as a first value) of the one or more values may indicate no transmission timing change for a specific transmission occasion compared to a first transmission occasion (initial transmission occasion) of the one or more UL reference signals. The first value (i.e., the specific value) may be a predetermined value. In one example, when the first value equals one, the first value indicates that there is no transmission timing change for a specific transmission occasion. However, the first value may be predetermined value other than 1. In another example, when the first value equals zero, the first value indicates that there is no transmission timing change for a specific transmission occasion.

Another value (referred to as a second value) of the one or more values may indicate an amount of transmission timing change compared to the transmission timing of the first transmission occasion (initial transmission occasion) of the one or more UL reference signals. In other words, the second value may indicate that the transmission timing for a certain transmission occasion has been changed in comparison to the first transmission occasion (initial transmission occasion). The second value may be a pre-determined value.

In one example, when the second value is less than one (but greater than or equal to zero), the second value indicates the amount of transmission timing change (the first value may be equal to one in this example). In this example, the smaller the second value is, the larger the indicated transmission timing change may be.

In another example, when the second value is greater than zero (but less than or equal to one), the second value indicates the amount of transmission timing change (the first value may be equal to zero in this example). In this example, the larger the second value is, the larger the indicated transmission timing change may be.

It should be noted that the terms 'first value' and 'second value' are used herein to distinguish the values, and they do not necessarily mean a specific order of the values in the vector.

For example, if the UE Tx TEG associated with the SRS resource is not changed, i.e., the amount of transmission timing change is not large, the UE may determine $y_n=c$, where $0 \le c \le 1$.

In one example, if the UE Tx TEG associated with the SRS resource is changed, the UE may determine $y_n=d$, where $d \le c$. In another example, if the UE Tx TEG associated with the SRS resource is changed, the UE may determine $x_n=b$, where $a \le b$. The UE Tx TEG associated with the SRS resource may be changed only for the n-th transmission occasion, or the changed Tx TEG may also be maintained for one or more subsequent transmission occasions.

The gNB measures 509 the one or more UL reference signals in order to obtain a plurality of measurement samples for RToA, and to measure the gNB Rx-Tx time difference. The gNB Rx-Tx time difference refers to a time difference between a reception time of the one or more UL reference signals and a transmission time of the one or more DL reference signals.

The UE transmits 510, to the gNB, a message comprising at least one vector $y=[y_1, y_2, \ldots, y_N]$ associated with the one or more UL reference signals and the measurement time window, wherein the at least one vector comprises one or more values indicating the one or more transmission timing changes performed by the UE. The at least one vector y may comprise at least the first vector. The message 510 may further comprise at least one of: a resource identifier associated with the UL reference signal (e.g., a SRS resource identifier), an identifier associated with the measurement time window, and/or an identifier associated with a RxTx TEG. The SRS resource may be associated with one or more PRS resources.

The message 510 may further comprise an identifier associated with at least one DL reference signal (e.g., PRS resource identifier), based on which the one or more transmission timing changes are performed. Thus, the UE may inform the gNB about the specific DL reference signal resource at a certain occasion that caused the UE to change the transmission timing.

The gNB determines 511, or calculates, an RToA value based at least partly on the one or more UL signals and the message 510 received from the UE by taking into account the transmission timing history vector indicating the history of the one or more transmission timing changes performed by the UE. For example, when the gNB calculates the RToA for a specific SRS resource by averaging a linear combination of a plurality of N measurement samples associated with the SRS resource, it may consider the transmission timing history vector $y=[y_1, y_2, \ldots, y_N]$ associated with the SRS resource.

For example, the RToA value may be calculated as follows:

$$RTOA = \frac{y_1 \times RTOA_1 + y_2 \times RTOA_2 + \ldots + y_N \times RTOA_N}{N},$$

wherein $RTOA_1 \ldots RTOA_N$ denote measurement samples for RTOA.

A specific measurement sample of the plurality of measurement samples may be excluded from the averaging, if a value of a transmission timing change corresponding with the specific measurement sample is less than one. For example, the UE may exclude or discard the n-th RToA measurement sample, if $y_n < 1$, so that X ns calibration by the gNB or LMF is valid for the other RToA measurement samples.

The gNB transmits 512, to the LMF, a report comprising at least the determined RToA value and the gNB Rx-Tx time difference.

The UE transmits 513, to the LMF, a report comprising at least the RSTD and the UE Rx-Tx time difference.

Based on the reports received from the UE and the gNB, the LMF may transmit 514 an indication to the UE to not change transmission timing of the one or more UL reference signals, or to not change transmission timing of at least one reference signal associated with a specific TEG identifier, during a certain time window in order to prioritize UE Tx TEG over UE RxTx TEG.

In another exemplary embodiment, the UE may transmit the transmission timing history vector associated with the UL reference signal to the LMF, which may use it for post-processing. In this case, the gNB may be requested to report the plurality of (N) RToA measurement samples to the LMF, and the calibration of RToA, considering the transmission timing change(s) of the UE, may be done by the LMF instead of by the gNB.

FIG. 6 illustrates a flow chart according to an exemplary embodiment. The functions illustrated in FIG. 6 may be performed by an apparatus such as, or comprised in, a terminal device (UE) or a base station. The terminal device or base station associated with FIG. 6 may also be referred to herein as a first network element of a wireless communication.

Referring to FIG. 6, one or more first reference signals are transmitted 601 on one or more transmission occasions within a time window to a second network element. One or more second reference signals are received 602 from the second network element. If the apparatus associated with FIG. 6 is a terminal device, then the second network element may be a base station, the first reference signal may refer to sounding reference signal (SRS), and the second reference signal may refer to positioning reference signal (PRS). If the apparatus associated with FIG. 6 is a base station, then the second network element may be a terminal device, the first reference signal may refer to positioning reference signal (PRS), and the second reference signal may refer to sounding reference signal (SRS). However, it should be noted that the first reference signal and the second reference signal are not restricted to SRS or PRS, as any other reference signal may also be used. It should also be noted that the terms 'first' and 'second' are used to distinguish the reference signals, and it does not mean a specific order of the reference signals.

One or more transmission timing changes are performed 603 on at least one of the one or more transmission occasions, on which the one or more first reference signals are transmitted, based at least partly on the one or more second reference signals.

A message comprising at least a first vector is transmitted 604 to the second network element, wherein the first vector comprises one or more values indicating the one or more transmission timing changes. The message may further comprise at least one of: a resource identifier associated with the one or more first reference signals, an identifier associated with the time window, and/or an identifier associated with a RxTx timing error group (TEG).

The one or more values in the first vector may be determined based at least partly on at least one threshold value. For example, at least one (e.g., $x_n$ or $y_n$) of the one or more values may be determined to be equal to one, if an amount of at least one of the one or more transmission timing changes is less than the at least one threshold value. As another example, at least one (e.g., $x_n$ or $y_n$) of the one or more values may be determined to be equal to zero, if an amount of at least one of the one or more transmission timing changes is greater than or equal to the at least one threshold value.

In another exemplary embodiment, the UE or base station may be configured with multiple threshold values. Then, the UE or base station may determine a constant value for each value ($x_n$ or $y_n$) in the transmission timing history vector (e.g., the first vector, the history information) depending on its transmission timing change.

FIG. 7 illustrates a flow chart according to an exemplary embodiment. The functions illustrated in FIG. 7 may be performed by an apparatus such as, or comprised in, a terminal device (UE) or a base station. The terminal device or base station associated with FIG. 7 may also be referred to herein as a second network element of a wireless communication network.

Referring to FIG. 7, one or more first reference signals are received 701 from a first network element. One or more second reference signals are transmitted 702 to the first network element. If the apparatus associated with FIG. 7 is a terminal device, then the first network element may be a base station, the first reference signal may refer to sounding reference signal (SRS), and the second reference signal may refer to positioning reference signal (PRS). If the apparatus associated with FIG. 7 is a base station, then the first network element may be a terminal device, the first reference signal may refer to positioning reference signal (PRS), and the second reference signal may refer to sounding reference signal (SRS). However, it should be noted that the first reference signal and the second reference signal are not restricted to SRS or PRS, as any other reference signal may also be used. It should also be noted that the terms 'first' and 'second' are used to distinguish the reference signals, and it does not mean a specific order of the reference signals.

A message comprising at least a first vector is received 703 from the first network element. The first vector (e.g., the history information) comprises one or more values indicating one or more transmission timing changes associated with one or more transmission occasions of the one or more first reference signals within a time window. The message may further comprise at least one of: a resource identifier associated with the one or more first reference signals, an identifier associated with the time window, and/or an identifier associated with a RxTx timing error group (TEG).

One or more positioning measurement values are determined 704 based at least partly on the one or more first reference signals and the message. The one or more positioning measurement values may refer to, for example, one or more reference signal time difference (RSTD) values, or to one or more relative time of arrival (RToA) values.

Time difference information indicative of a Rx-Tx time difference between a reception time of the one or more first reference signals and a transmission time of the one or more second reference signals is determined 705.

A report indicating the one or more positioning measurement values and the time difference information is transmitted 706. The report may be transmitted, for example, to the first network element or to a location management function (LMF).

FIG. 8 illustrates a flow chart according to an exemplary embodiment. The functions illustrated in FIG. 8 may be performed by an apparatus such as, or comprised in, a location management function (LMF) of a wireless communication network.

Referring to FIG. 8, a message is transmitted 801 to a first network element of a wireless communication network, wherein the message indicates one or more rules for recording and indicating one or more transmission timing changes on one or more transmission occasions of one or more first reference signals within a time window. The first reference signal may refer to PRS, SRS, or any other reference signal. The first network element may be, for example, a terminal device or a base station. The one or more rules may indicate to record the one or more transmission timing changes by creating a first vector that comprises one or more values indicating the one or more transmission timing changes associated with the one or more transmission occasions, and indicating the first vector to a second network element.

The one or more rules may comprise at least one threshold value for the one or more transmission timing changes. The at least one threshold value may be configured jointly with measurement time window information, or the threshold value may be configured jointly with a batch reporting request. Alternatively, the at least one threshold value may be configured separately from the measurement time window information and the batch reporting request.

FIG. 9 illustrates a flow chart according to an exemplary embodiment, wherein the at least one threshold value is determined 901 based at least partly on at least one of: a measurement accuracy requirement or quality, an error range value of at least one Tx TEG associated with the first reference signal, and/or an error range of the RxTx TEG. The functions illustrated in FIG. 9 may be performed by an apparatus such as, or comprised in, a location management function (LMF) of a wireless communication network.

The functions and/or blocks described above by means of FIGS. 4-9 are in no absolute chronological order, and some of them may be performed simultaneously or in an order differing from the described one. Other functions and/or blocks may also be executed between them or within them.

A technical advantage provided by some exemplary embodiments is that they may improve positioning accuracy for positioning measurements such as RSTD and/or RToA, when the base station includes RToA and gNB Rx-Tx time difference in a single report, and/or when a UE includes RSTD and UE-Rx-Tx time difference in a single report.

Figure 10:
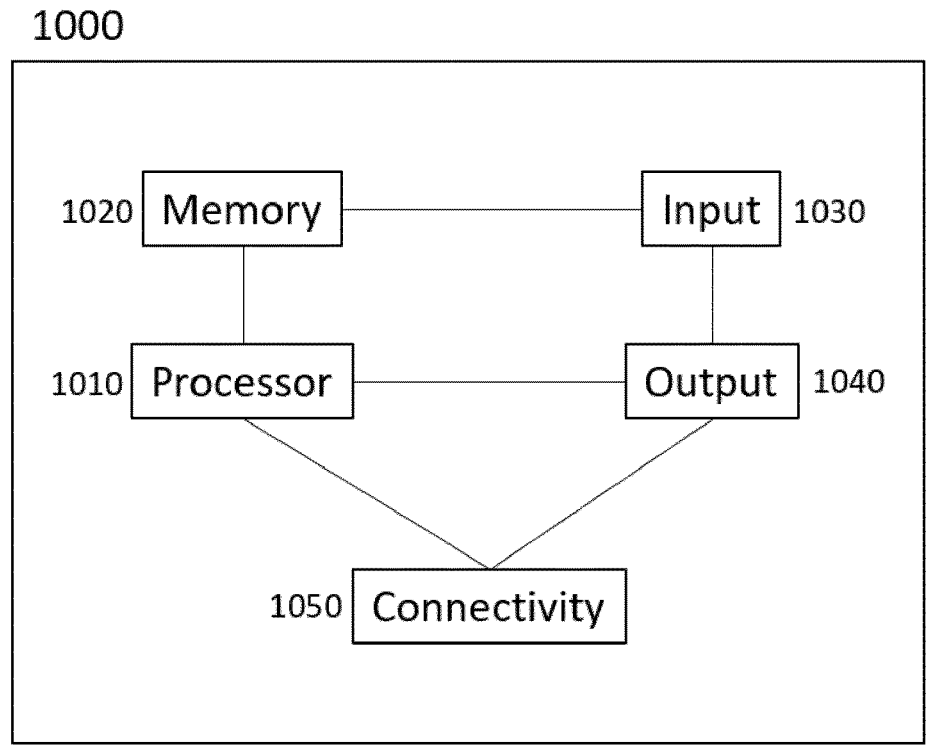
FIGS. 10-11 illustrate apparatuses according to some exemplary embodiments.

FIG. 10 illustrates an apparatus 1000, which may be an apparatus such as, or comprised in, a terminal device, according to an exemplary embodiment. The terminal device may also be referred to as a UE, user equipment, first network element, or second network element herein. The apparatus 1000 comprises a processor 1010. The processor 1010 interprets computer program instructions and processes data. The processor 1010 may comprise one or more programmable processors. The processor 1010 may comprise programmable hardware with embedded firmware and may, alternatively or additionally, comprise one or more application-specific integrated circuits (ASICs).

The processor 1010 is coupled to a memory 1020. The processor is configured to read and write data to and from the memory 1020. The memory 1020 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1020 stores computer readable instructions that are executed by the processor 1010. For example, non-volatile memory stores the computer readable instructions and the processor 1010 executes the instructions using volatile memory for temporary storage of data and/or instructions.

The computer readable instructions may have been pre-stored to the memory 1020 or, alternatively or additionally, they may be received, by the apparatus, via an electromagnetic carrier signal and/or may be copied from a physical entity such as a computer program product. Execution of the computer readable instructions causes the apparatus 1000 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1000 may further comprise, or be connected to, an input unit 1030. The input unit 1030 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1030 may comprise an interface to which external devices may connect to.

The apparatus 1000 may also comprise an output unit 1040. The output unit may comprise or be connected to one or more displays capable of rendering visual content, such as a light emitting diode (LED) display, a liquid crystal display (LCD) and/or a liquid crystal on silicon (LCoS) display. The output unit 1040 may further comprise one or more audio outputs. The one or more audio outputs may be for example loudspeakers.

The apparatus 1000 further comprises a connectivity unit 1050. The connectivity unit 1050 enables wireless connectivity to one or more external devices. The connectivity unit 1050 comprises at least one transmitter and at least one receiver that may be integrated to the apparatus 1000 or that the apparatus 1000 may be connected to. The at least one transmitter comprises at least one transmission antenna, and the at least one receiver comprises at least one receiving antenna. The connectivity unit 1050 may comprise an integrated circuit or a set of integrated circuits that provide the wireless communication capability for the apparatus 1000. Alternatively, the wireless connectivity may be a hardwired application-specific integrated circuit (ASIC). The connectivity unit 1050 may comprise one or more components such as a power amplifier, digital front end (DFE), analog-to-digital converter (ADC), digital-to-analog converter (DAC), frequency converter, (de) modulator, and/or encoder/decoder circuitries, controlled by the corresponding controlling units.

It is to be noted that the apparatus 1000 may further comprise various components not illustrated in FIG. 10. The various components may be hardware components and/or software components.

Figure 11:
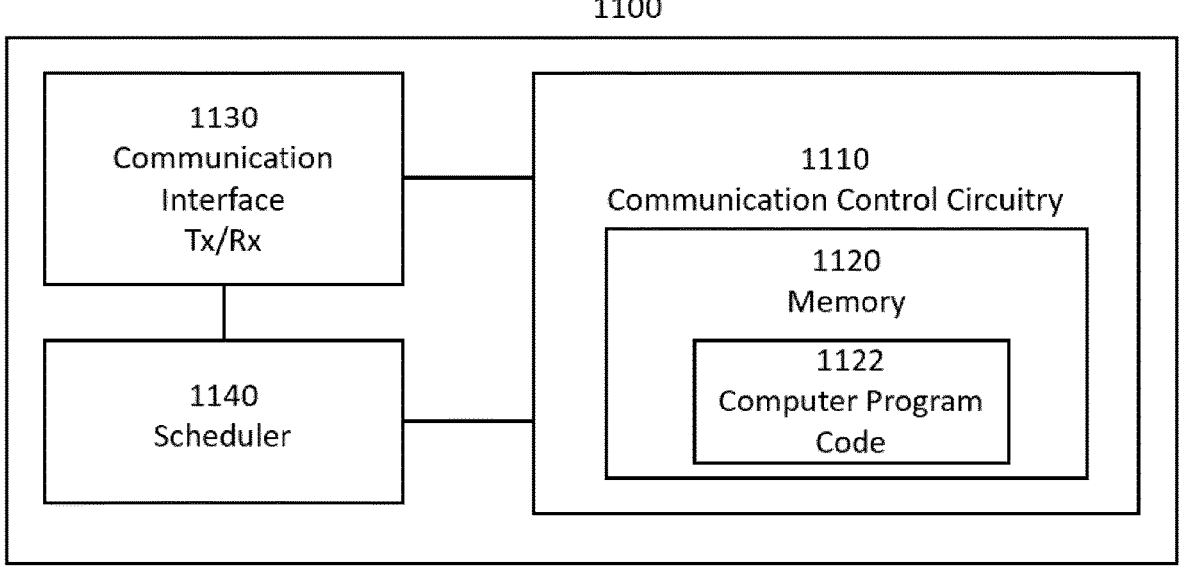

The apparatus 1100 of FIG. 11 illustrates an exemplary embodiment of an apparatus such as, or comprised in, a base station or LMF. The apparatus 1100 of FIG. 11 may also be referred to, for example, as a first network element, a second network element, a network node, a RAN node, a NodeB, an LTE evolved NodeB (eNB), a gNB, an NR base station, a 5G base station, an access node, an access point (AP), a distributed unit (DU), a central unit (CU), a baseband unit (BBU), a radio unit (RU), a radio head, a remote radio head (RRH), or a transmission and reception point (TRP). The apparatus may comprise, for example, a circuitry or a chipset applicable for realizing some of the described exemplary embodiments. The apparatus 1100 may be an electronic device comprising one or more electronic circuitries. The apparatus 1100 may comprise a communication control circuitry 1110 such as at least one processor, and at least one memory 1120 including a computer program code (software) 1122 wherein the at least one memory and the computer program code (software) 1122 are configured, with the at least one processor, to cause the apparatus 1100 to carry out some of the exemplary embodiments described above.

The processor is coupled to the memory 1120. The processor is configured to read and write data to and from the memory 1120. The memory 1120 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage.

In general, memories may be referred to as non-transitory computer readable media. The memory 1120 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1120 or, alternatively or additionally, they may be received, by the apparatus, via an electromagnetic carrier signal and/or may be copied from a physical entity such as a computer program product. Execution of the computer readable instructions causes the apparatus 1100 to perform one or more of the functionalities described above.

The memory 1120 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1100 may further comprise a communication interface 1130 comprising hardware and/or software for realizing communication connectivity according to one or more communication protocols. The communication interface 1130 comprises at least one transmitter (Tx) and at least one receiver (Rx) that may be integrated to the apparatus 1100 or that the apparatus 1100 may be connected to. The communication interface 1130 provides the apparatus with radio communication capabilities to communicate in the cellular communication system. The communication interface may, for example, provide a radio interface to terminal devices. The apparatus 1100 may further comprise another interface towards a core network such as the network coordinator apparatus and/or to the access nodes of the cellular communication system. The apparatus 1100 may further comprise a scheduler 1140 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:

receive one or more first reference signals;

transmit one or more second reference signals;

receive a message comprising at least a first vector, wherein the first vector comprises one or more values indicating one or more transmission timing changes associated with one or more transmission occasions of the one or more first reference signals within a time window;

determine one or more positioning measurement values based at least partly on the one or more first reference signals and the message;

determine time difference information between a reception time of the one or more first reference signals and a transmission time of the one or more second reference signals; and transmit a report indicating the one or more positioning measurement values and the time difference information.

2. The apparatus of claim 1, wherein the message further comprises at least one of: a resource identifier associated with the one or more first reference signals, an identifier associated with the time window, and/or an identifier associated with a RxTx timing error group.

3. The apparatus of claim 1, wherein each of the one or more values is less than or equal to one, wherein a first value of the one or more values indicates no transmission timing change compared to a first transmission occasion of the one or more first reference signals, and wherein a second value of the one or more values indicates an amount of transmission timing change compared to the first transmission occasion of the one or more first reference signals.

4. The apparatus of claim 3, wherein the first value equals one, and wherein the second value is less than one.

5. The apparatus of claim 1, wherein the one or more positioning measurement values are determined by averaging a linear combination of a plurality of measurement samples associated with the one or more first reference signals based at least partly on the first vector.

6. The apparatus of claim 5, wherein a specific measurement sample of the plurality of measurement samples is excluded from the averaging, if a value of a transmission timing change corresponding with the specific measurement sample is less than one.

7. The apparatus of claim 1, wherein the apparatus is further caused to:

receive one or more third reference signals different to the one or more first reference signals, wherein the message further includes at least a second vector, wherein the second vector comprises one or more values indicating one or more transmission timing changes associated with one or more transmission occasions of the one or more third reference signals within the time window, and wherein the one or more positioning measurement values comprise at least a reference signal time difference value, which is determined based at least partly on the first vector and the second vector.

8. An apparatus comprising at least one processor, and at least one memory including computer program code, wherein the at least one memory and the computer program code are configured, with the at least one processor, to cause the apparatus to:

transmit one or more first reference signals on one or more transmission occasions within a time window;

receive one or more second reference signals;

perform, based at least partly on the one or more second reference signals, one or more transmission timing changes on at least one of the one or more transmission occasions, on which the one or more first reference signals are transmitted; and transmit a message comprising at least a first vector, wherein the first vector comprises one or more values indicating the one or more transmission timing changes.

9. The apparatus of claim 8, wherein the message further comprises at least one of: a resource identifier associated with the one or more first reference signals, an identifier associated with the time window, and/or an identifier associated with a RxTx timing error group.

10. The apparatus of claim 8, wherein each of the one or more values is less than or equal to one, wherein a first value of the one or more values indicates no transmission timing change compared to a first transmission occasion of the one or more first reference signals, and wherein a second value of the one or more values indicates an amount of transmission timing change compared to the first transmission occasion of the one or more first reference signals.

11. The apparatus of claim 8, wherein the apparatus is further caused to:

determine the one or more values based at least partly on at least one threshold value.

12. The apparatus of claim 11, wherein at least one of the one or more values is determined to be equal to one, if an amount of at least one of the one or more transmission timing changes is less than the at least one threshold value.

13. The apparatus of claim 11, wherein at least one of the one or more values is determined to be equal to zero, if an amount of at least one of the one or more transmission timing changes is greater than or equal to the at least one threshold value.

14. A method comprising:

receiving one or more first reference signals;

transmitting one or more second reference signals;

receiving a message comprising at least a first vector, wherein the first vector comprises one or more values indicating one or more transmission timing changes associated with one or more transmission occasions of the one or more first reference signals within a time window;

determining one or more positioning measurement values based at least partly on the one or more first reference signals and the message;

determining time difference information between a reception time of the one or more first reference signals and a transmission time of the one or more second reference signals; and transmitting a report indicating the one or more positioning measurement values and the time difference information.

* * * * *